(12) United States Patent
Preece

(10) Patent No.: US 6,190,253 B1
(45) Date of Patent: Feb. 20, 2001

(54) STRAW WALKERS HAVING A SUPPLEMENTAL ROTARY SEPARATOR

(75) Inventor: David C. Preece, Nottingham (GB)

(73) Assignee: Deere & Company, Moline, IL (US)

(*) Notice: Under 35 U.S.C. 154(b), the term of this patent shall be extended for 0 days.

(21) Appl. No.: 09/033,355

(22) Filed: Mar. 2, 1998

(30) Foreign Application Priority Data

Mar. 7, 1997 (DE) ............................................. 197 09 396

(51) Int. Cl.⁷ ................................................. A01F 12/30
(52) U.S. Cl. ............................. 460/85; 460/113; 460/901
(58) Field of Search .................................. 460/85, 86, 87, 460/88, 89, 84, 113, 901

(56) References Cited

U.S. PATENT DOCUMENTS

| | | | |
|---|---|---|---|
| 249,055 | * | 11/1881 | Janney ..................................... 460/85 |
| 833,700 | * | 10/1906 | Still ........................................ 460/86 |
| 1,263,233 | * | 4/1918 | Habeck ................................... 460/86 |
| 1,547,476 | * | 7/1925 | White ..................................... 460/85 |
| 2,150,856 | * | 3/1939 | Williams ................................ 460/113 |
| 2,670,845 | * | 3/1954 | Busack et al. ......................... 460/85 |
| 2,950,720 | * | 8/1960 | Sheard ................................... 460/86 |
| 3,347,244 | * | 10/1967 | Kepkay et al. ...................... 460/113 |
| 3,593,719 | * | 7/1971 | Ashton ................................... 460/85 |
| 3,620,223 | * | 11/1971 | Witzel .................................. 460/113 |
| 4,959,038 | * | 9/1990 | Ragsdale ................................ 460/86 |
| 5,021,029 | * | 6/1991 | Usick ..................................... 460/85 |
| 5,487,703 | * | 1/1996 | Kuchar ................................... 460/85 |

FOREIGN PATENT DOCUMENTS

| | | |
|---|---|---|
| 13 01 602 | 11/1969 | (DE) . |
| 1582412 | 6/1970 | (DE) . |
| 1904406 | 5/1972 | (DE) . |
| 2103981 | 2/1974 | (DE) . |
| 2419268 | 11/1975 | (DE) . |
| 2431588 | 2/1976 | (DE) . |
| 2512150 | 10/1976 | (DE) . |
| 2235061 | 11/1977 | (DE) . |
| 3211177 | 10/1982 | (DE) . |
| 3621995 | 1/1988 | (DE) . |
| 4127118 | 2/1993 | (DE) . |
| 42 09 020 | 9/1993 | (DE) . |
| 4209020 A1 | * 9/1993 | (DE) ...................................... 460/85 |
| 4209020 | 4/1996 | (DE) . |
| 582097 A2 | * 2/1994 | (EP) ...................................... 460/85 |
| 1473891 | 2/1967 | (FR) . |
| 2 192 757 | 2/1974 | (FR) . |
| 2 342 022 | 2/1976 | (FR) . |
| 698324 | 10/1953 | (GB) . |
| 6 903 708 | 9/1970 | (NL) . |
| 664608 | * 5/1979 | (SU) ...................................... 460/86 |
| 1664167 | * 4/1991 | (SU) ...................................... 460/85 |

OTHER PUBLICATIONS

Database WPI Section PQ Week 9218 Derwent Publications Ltd., Londaon, GB; Clas P12, AN 92–148629 XP002064934 & SU 1 664 167 A (Mosc Agric Prod Eng).

* cited by examiner

*Primary Examiner*—Robert E. Pezzuto
*Assistant Examiner*—Arpad Fabian Kovacs

(57) ABSTRACT

Conventional agricultural combines are equipped with straw walkers for separating grain entrapped in the threshed crop mat. A rotary separator having two transverse rotors arranged one behind the other is positioned above the straw walkers. The rotors can be driven in the same or in opposite directions and are provided with tines for penetrating the crop mat. The tines are rotatively mounted to an eccentric axle located in the rotor housing.

16 Claims, 2 Drawing Sheets

STRAW WALKERS HAVING A SUPPLEMENTAL ROTARY SEPARATOR

BACKGROUND OF THE INVENTION

1. Field of the Invention

The invention is directed to a straw walker combine having a supplemental rotary separator located above the straw walkers.

2. Description of the Prior Art

DE-OS-1 904 406 discloses a combine with a tine-equipped rotor operating as an undershot conveyor located above straw walkers. This tine-equipped rotor is composed of a rotor housing, an axle supported eccentrically in bearings therein and tines rotatively supported in bearings on the axle and extending through the wall of the rotor housing. During the rotation of the rotor housing, the tines projecting to the greatest amount at the bottom of the rotor housing are moved in the direction of conveying of the straw walkers and tear apart the mat of straw, resulting in an increase in the separation of kernels still retained in the straw. To increase the rate of separation the tines are either fastened to the shaft through wobble plates or the shaft is constantly moved axially by means of an eccentric-drive motor. In this way the free ends of the tines also move in the axial direction of the rotor and further tear apart the mat of straw.

DE-OS-22 35 061 discloses a combine in which an overshot conveyor similar to a pick-up is located in its region between straw walkers and straw hood. In a forward region of the straw walkers this overhead conveyor takes up straw and delivers it again further downstream. In the region underneath the short straw can be separated. The overhead conveyor can also be provided immediately following a walker. A similar arrangement is also known from FR-PS-1,473,891 and DE-AS-2 103 981, where the arrangement according to the latter citations can be brought into a non-operating position.

According to GB-PS-698,324 an overhead conveyor is also provided above straw walkers that consists of a drum and on which toothed strips are mounted in the trailing direction.

DE-OS-2 431 588 teaches a supplementary separator in the delivery region of the thresher arrangement of a combine, that is provided with movable or flexible tines supported on a rotor which perform undershot conveying of the crop. The tines are flexible, but always extend with their full length into the crop. It is also proposed that several supplementary separators be arranged one after another.

According to DE-C3-42 09 020 a separator drum operating as overhead conveyor is inserted between a threshing assembly and a straw walker which catches the crop coming from the threshing assembly which has been threshed out and decelerates it so that kernels contained in the mass of the crop are deposited on the surface of the separator drum while the straw is passed along to the straw walkers.

DE-A1-41 27 118 shows a combine with straw walkers and a crop processing arrangement located above the walkers, which performs undershot conveying on the crop. Ahead of the crop processing arrangement a belt of tines is provided that also performs undershot conveying which tears apart the mass of crop and throws it at high speed into the slot between the crop processing arrangement and the straw walker.

SUMMARY

It is an object of the present invention to provide a supplementary separating arrangement located above the straw walkers.

In this way the mass of the crop is intensively processed over a longer path. Due to the transition between at least two rotors a continuous acceleration and separation effect is achieved since the mass of the crop cannot be transported as a homogeneous band. These changes in motion promote the discharge of kernels still contained in the straw. This effect is apparent with any possible method of operation of the two rotors.

If the two rotors rotate in the same direction, the rotors can perform either overshot or undershot conveying, the straw is handled gently, which is of particular advantage with very dry straw, since there the separation is not overloaded by a high proportion of short straw. Furthermore this straw can be handled better in subsequent processing operations.

Rotors that rotate in opposite directions, wherein one rotor performs overshot conveying and the other rotor performs undershot conveying, are advantageous where a high degree of processing of the mass of the crop is required and/or the quality of the straw is less important. This arrangement also leads to a secure adherence of the straw to the straw walkers, which avoids jamming, for example, with rape straw or long straw.

Since the consistency of the crop and therewith its stiffness can frequently change, its handling is improved by varying the aggressiveness of the conveying by the tines.

A projection on the walkers that extends between the circumference of the two rotors, has the effect of braking the mass of the crop resulting in additional separation. If the projection is provided with separator openings, the kernels can fall out directly after the separating process. The projection also has the effect of promoting reliable conveying of the crop, so that there is no jamming in the intermediate region between two rotors.

Due to the possibility of changing the direction of rotation and/or the eccentricity of the tines, that is, the amount of their projection beyond the rotor housing, further accommodation to the conditions of the crop and types of crop can be attained.

A change in the distance between the rotors and the straw walkers can be useful, for example, to stop operation of the rotor during breakage of corn or to conform the degree of action of the tines to the immediate requirements.

The application of a guide arrangement above the rotors, in any case above the first rotor, assures that jamming is avoided, particularly with hard, coarse stalks. Instead the crop is continuously guided along the wall.

A rotor conveying more rapidly than the straw walkers has the effect that the mass of straw grasped by it is thinned out and thereby performs separation more easily.

DETAILED DESCRIPTION

Figure 1:
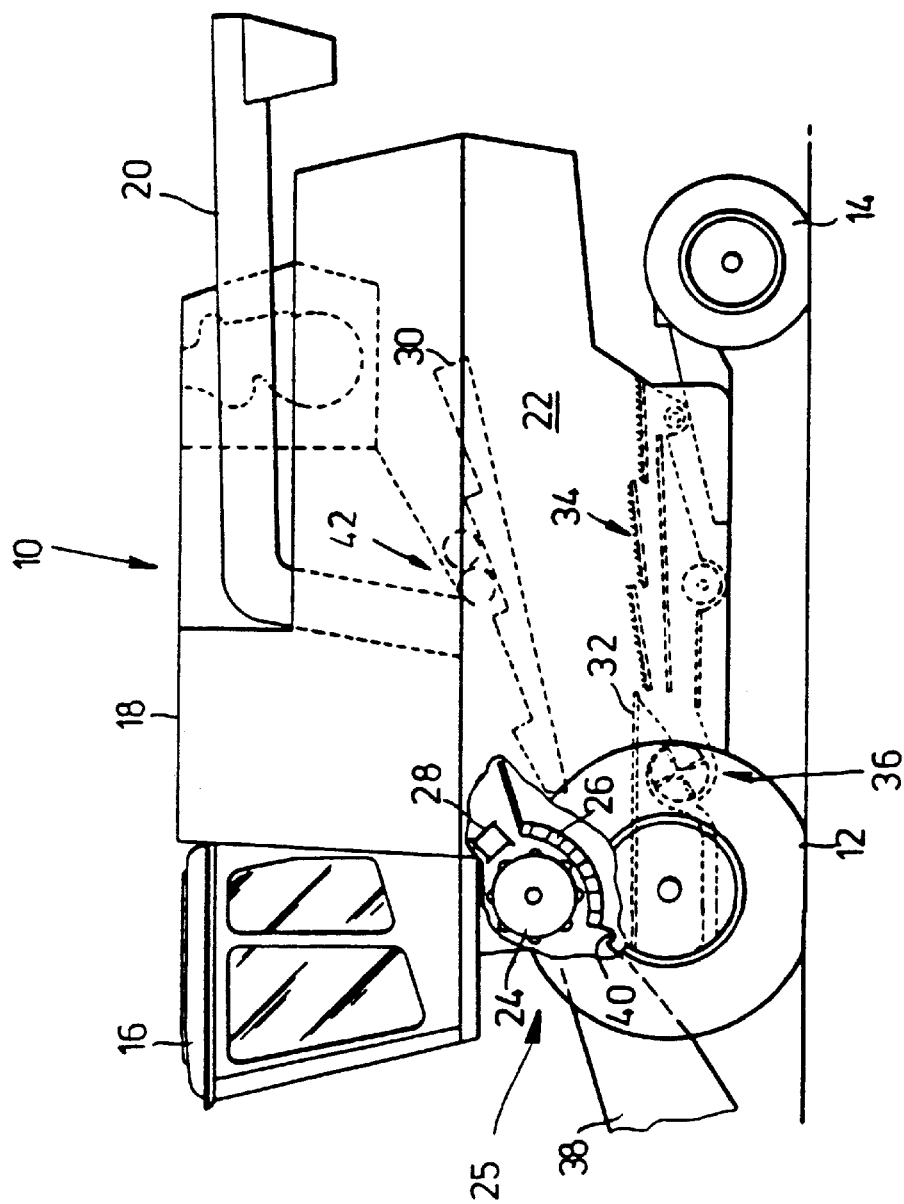
FIG. 1 shows a semi-schematic side view of a straw walker combine having a supplemental rotary separator.

A combine 10, shown in FIG. 1, is supported on front driven and rear steerable wheels 12 and 14 respectively. The combine 10 is provided with an operator's cab 16 from which it can be controlled by an operator. In place of a combine a stationary threshing machine, an experimental thresher installation or the like could be considered. A grain tank 18 is located to the rear of the operator's cab 16 for temporarily storing clean. The clean grain is removed from the grain tank 18 by unloading auger 20. The grain tank 18 is supported on a frame 22. Harvested crop material is directed past stone trap 40 and into the frame 22 by feederhouse 38. The harvested crop material is separated into large and small components by a threshing cylinder 24, a threshing concave 26 and a beater 28. Further separation of the harvested crop is performed on straw walkers 30 located downstream from the threshing assembly 25 as well as on a preparation chute 32 and sieves 34 until the clean grain is elevated into the clean grain tank 18. The large components of the crop material are deposited on the ground from the straw walkers 30 and light components of the crop material are blown by means of a blower 36 from the sieves 34 also onto the ground. A rotary separator 42 is located above the straw walkers 30 which will be described in greater detail with reference to FIGS. 2–4.

The rotary separator 42 loosens the mass of the crop conducted from the threshing assembly 25 onto the straw walkers 30, so that kernels contained therein can pass through openings in the walker and fall onto the sieves 34. For this purpose the rotary separator 42 contains at least two transverse rotors 44 arranged one behind the other, whose spacing is selected in such a way that the crop leaving the upstream rotor 44' can be grasped by the downstream rotor 44".

Each rotor 44 consists of a rotor housing 46, an axle 48 eccentrically supported in bearings therein and tines 50 rotatively fastened to the axle 48. The tines may be rigid or flexible.

Each rotor housing 46 with the axle 48 and the tines 50 is configured as a conventional drum conveyor, such as found in the center of an intake screw conveyor of a header assembly or pickup platform, so that a detailed description can be omitted.

The rotor housing 46 is configured as a tube that is provided with openings for the tines 50 over its entire length and in several rows distributed about the circumference. The rotor housing 46 is rotatively supported in bearings in both sides in the side walls of the frame 22 and is driven from at least one side.

In this special embodiment the direction of rotation and the rotational speed of each rotor 44, that is, its rotor housing 46, can be varied by means of a corresponding gearbox, not shown, for example, a wrap-around drive and/or a planetary gearbox.

The axle 48 is also supported in bearings in the frame 22 and extends parallel to the longitudinal centerline of the rotor housing 46. Although the relative position of the axle 48 during operation is basically unchanged, a change in position of the axle 48 can fundamentally be performed in order to change the aggressiveness of the tines 50. For this purpose the axle 48 can be supported in bearings in known manner on control levers or the like and moved about a pivot point, so that the distance to all points of projection of the tines 50 from the rotor housing 46 can be changed.

The tines 50 are configured as straight-line elements and preferably comprise spring steel, so that the rotors 44 can be driven in both directions. If each of the rotors 44 is to be driven in only one direction, the tines 50 may be curved in the trailing direction. In known manner and therefore not shown, the tines 50 are rotatively supported in bearings on the axle 48 within the rotor housing 46 and move during the rotation of the rotor housing 46 essentially in radial direction through its wall between two end positions.

Figure 2:
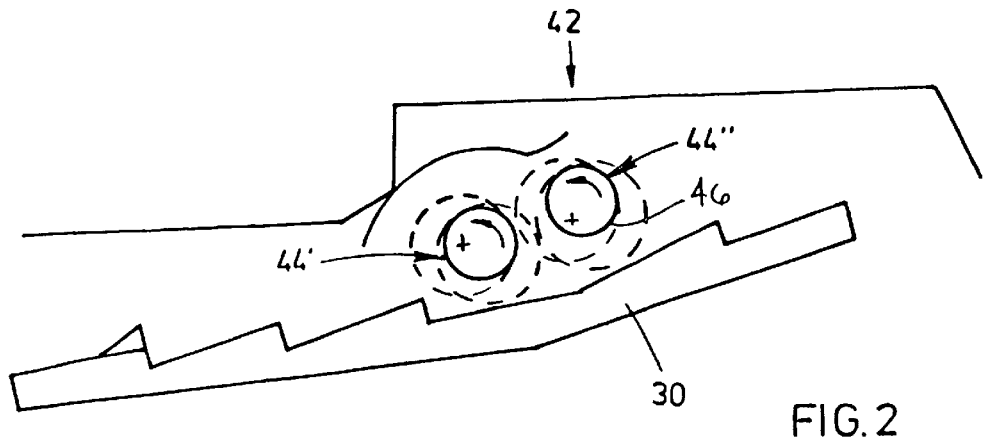
FIG. 2 shows the rotary separator according to a first embodiment.
Figure 3:
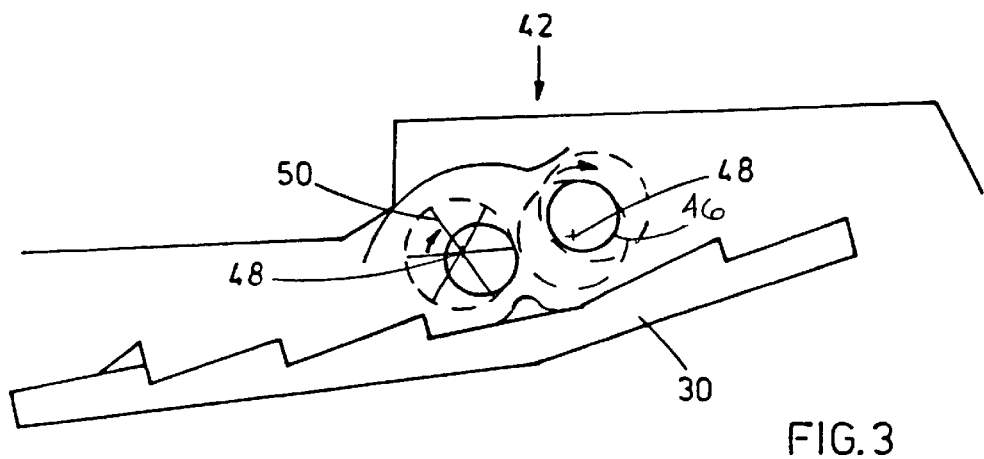
FIG. 3 shows the rotary separator according to a second embodiment.
Figure 4:
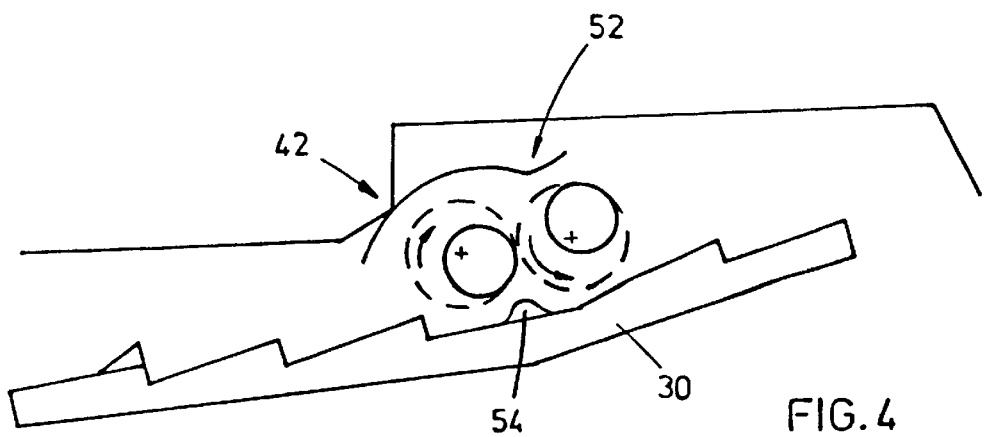
FIG. 4 shows the rotary separator according to a third embodiment.

The illustrations of FIGS. 2–4 show the rotors 44 in each case driven in different directions. Since each direction of rotation requires a definite and different position of the tines 50, each direction of rotation is associated with a change in the path of movement of the tines 50, as is shown in the figures.

Above the rotary separators 42 a guide arrangement 52 is provided which assures a continuous flow of the crop. This guide arrangement 52 may consist of a sheet metal guide, in any case a smooth surface, as well as curved blades that follow a shape shown in the drawing, which follows the path of movement of the tines 50.

In their region underneath the rotary separator 42, the straw walkers 30 also conform to the path of movement of the tines 50 or to the flow of the crop to be expected to great advantage, although not absolutely required. In the embodiment illustrated in FIG. 2, both rotors 44 perform undershot conveying and no steep step is provided on the straw walkers 30, instead the straw walkers 30 are flat in this region. As in the remaining region, the straw walkers 30 are perforated underneath the rotary separator 42 as well.

In the embodiments illustrated in FIGS. 3 and 4, a hump-shaped projection 54 is provided that extends into the intermediate region between two paths of movement of the tines 50. Since the straw walkers 30 perform an oscillating movement, it is not possible to fill the intermediate region completely with a projection 54.

The three embodiments illustrated in FIGS. 2–4 differ essentially in the direction of rotation of the rotors 44. Thus in FIG. 2 both rotors rotate in the same direction and perform undershot conveying on the crop. Hence the mass of the crop is drawn securely and in contact with the straw walkers 30.

FIG. 3 shows a version in which both rotors 44 perform overshot conveying, that is, operate as overhead conveyors. Here the vertical movement of the crop is bounded downward by the rotor housings 46 and upward by the guide arrangement 52. The projection 54 extends into the lower intermediate region which also provides that no more crop is conveyed upstream. As a result of this configuration the mat of crop is passed along from the forward rotor 44' to the rear rotor 44", where it passes the slot between these and permits kernels to fall out downward.

In the embodiment illustrated in FIG. 4, the forward rotor 44' is driven so as to perform overshot conveying and the rear rotor 44" is driven so as to perform undershot conveying, so that the crop follows an S-shaped path, along which it is continuously guided and has no possibility of building up so as to cause a jam. The change in direction as well as the penetrating attack of the tines 50 leads to an increased degree of separating performance.

In the embodiments of FIGS. 3 and 4 the configuration and the arrangement of the guide arrangement 52 and the projection 54 are the same.

The present invention should not be limited by the disclosed embodiments but should be limited solely by the claims that follow.

I claim:

1. An agricultural combine having straw walkers and a rotary separator located above the straw walkers characterized by the rotary separator comprises at least two transverse rotors one arranged behind the other and located above the straw walkers, the rotors are provided with a rotor housing having an eccentrically supported axle located therein, the axle is provided with tines rotatively fastened to the axle, the tines pass through the rotor housing for contacting a crop mat being processed by the straw walkers.

2. An agricultural combine according to claim 1 wherein the rotors rotate in the same direction.

3. An agricultural combine according claim 2 wherein the eccentricity of the tines can be varied.

4. An agricultural combine according to claim 1 wherein the rotors rotate in opposite directions.

5. An agricultural combine according claim 4 wherein the eccentricity of the tines can be varied.

6. An agricultural combine according to claim 1 wherein at least one rotor performs overshot conveying and a region of the straw walkers below and between the rotors is provided with a hump-like projection extending into a space between the rotors.

7. An agricultural combine according to claim 1 wherein the direction of rotation of the rotors can be varied.

8. An agricultural combine according to claim 2 wherein the direction of rotation of the rotors can be varied.

9. An agricultural combine according to claim 4 wherein the direction of rotation of the rotors can be varied.

10. An agricultural combine according to claim 1 wherein the distance between the rotors and the straw walkers can be varied.

11. An agricultural combine according claim 1 wherein a guide arrangement is located above the rotors.

12. An agricultural combine according claim 2 wherein a guide arrangement is located above the rotors.

13. An agricultural combine according claim 4 wherein a guide arrangement is located above the rotors.

14. An agricultural combine according to claim 1 wherein the rotors are driven at a higher conveying speed than that of the straw walkers.

15. An agricultural combine according to claim 2 wherein the rotors are driven at a higher conveying speed than that of the straw walkers.

16. An agricultural combine according to claim 4 wherein the rotors are driven at a higher conveying speed than that of the straw walkers.

* * * * *